United States Patent [19]

Dimov

[11] Patent Number: 5,682,799
[45] Date of Patent: Nov. 4, 1997

[54] EXTERNAL CYLINDRICAL GEARING

[76] Inventor: Ivan Ivanov Dimov, "Ljulin", bl.412, vh.B, app.29, 1359 Sofia, Bulgaria

[21] Appl. No.: 553,462
[22] PCT Filed: Apr. 28, 1994
[86] PCT No.: PCT/BG94/00004
    § 371 Date: Oct. 27, 1995
    § 102(e) Date: Oct. 27, 1995
[87] PCT Pub. No.: WO94/25778
    PCT Pub. Date: Oct. 11, 1994

[30] Foreign Application Priority Data

Apr. 28, 1993 [BG] Bulgaria .................... 97677

[51] Int. Cl.$^6$ ............................... F16H 57/02
[52] U.S. Cl. ........................... 74/606 R; 74/417
[58] Field of Search ......................... 74/606 R, 417

[56] References Cited

U.S. PATENT DOCUMENTS

| | | | |
|---|---|---|---|
| 4,435,994 | 3/1984 | Hata et al. | |
| 5,095,767 | 3/1992 | Spridco et al. | 74/606 R X |
| 5,099,715 | 3/1992 | Baiker | 74/606 R X |
| 5,193,501 | 3/1993 | Klejeski et al. | 74/606 R X |
| 5,245,883 | 9/1993 | Min | 74/606 R X |
| 5,291,801 | 3/1994 | Hanada et al. | 74/606 R |
| 5,375,479 | 12/1994 | Kouno et al. | 74/606 R X |
| 5,404,772 | 4/1995 | Jester | 74/606 R |
| 5,501,117 | 3/1996 | Mensing et al. | 74/606 R X |
| 5,505,101 | 4/1996 | Curtis | 74/417 |

FOREIGN PATENT DOCUMENTS

| | | |
|---|---|---|
| 25 18 115 | 3/1977 | Germany. |
| 628 963 | 3/1982 | Switzerland. |
| 284542 | 1/1971 | U.S.S.R.. |
| 507730 | 4/1976 | U.S.S.R.. |
| 793417 | 12/1980 | U.S.S.R.. |
| 1634548 | 3/1991 | U.S.S.R.. |
| 950838 | 2/1964 | United Kingdom ........ 74/606 R |

*Primary Examiner*—Vinh T. Luong
*Attorney, Agent, or Firm*—Herbert Dubno

[57] ABSTRACT

Reduction gearing using a nonsplit or one-piece case where bearing housings are formed in the slots of the case opposite one another to receive at least intermediate pinion stems with ends journaled in bearings in the respective bearing housings. The bearing housings are formed with exterior slots of a width at least equal to the diameters of reduced necks at the ends of the pinion stems or sufficient to clear the inner races of the bearings, when such races are provided, so that the reduced diameter portions or inner races can be laterally inserted into the bearing housings and the outer races then positioned axially therein to retain the journals. The outer races have two shoulders for the respective bearing rollers. The construction allows preassembly externally of the case of the pinion stems and mounting of the pinion stems within the case via the bearing assemblies.

5 Claims, 8 Drawing Sheets

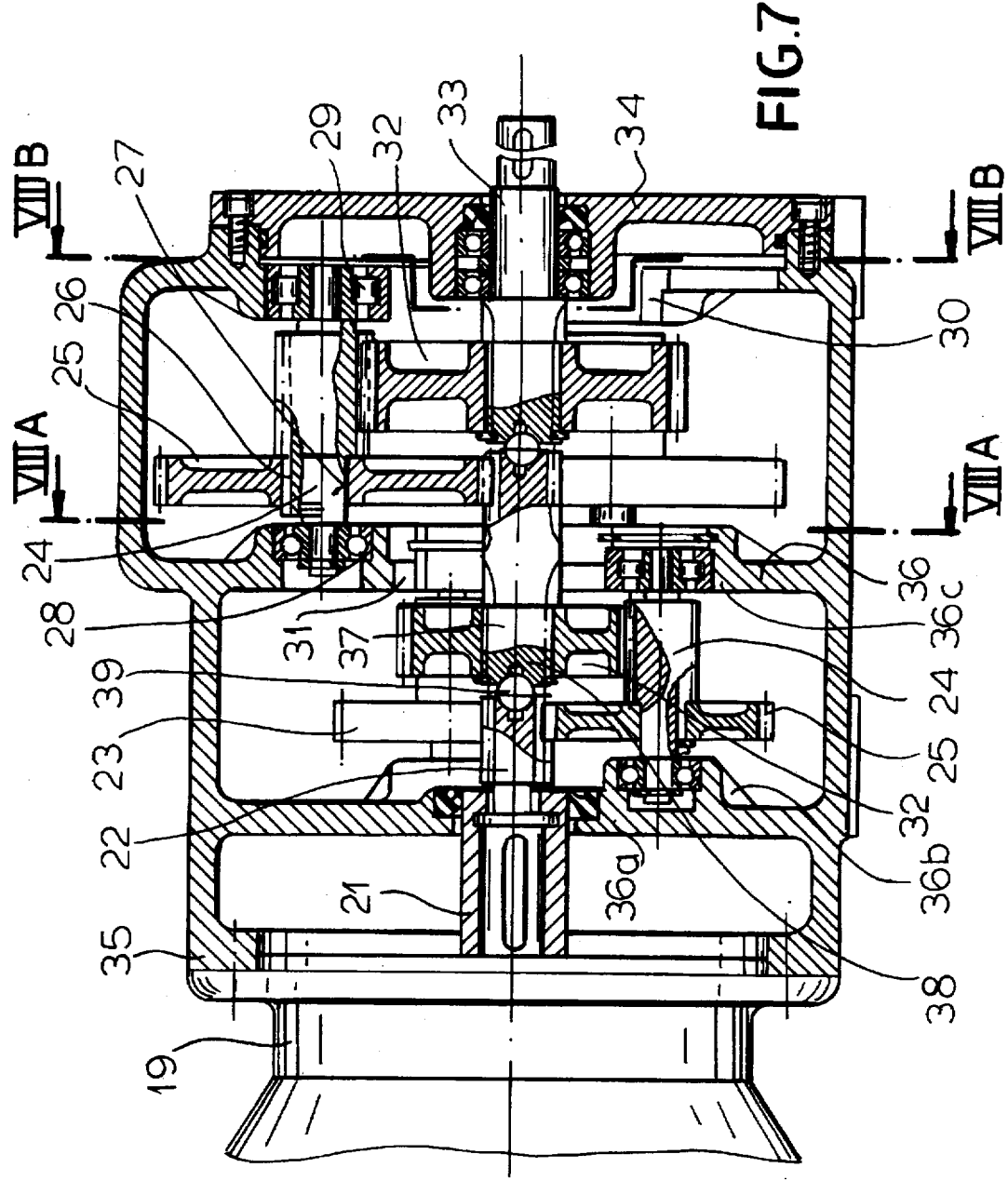

EXTERNAL CYLINDRICAL GEARING

CROSS REFERENCE TO RELATED APPLICATIONS

This application is a national phase of PCT/GB 94/00004 filed 28 Apr. 1994 and based, in turn, upon Bulgarian national application 97677 of 28 Apr. 1993 under the International Convention.

FIELD OF THE INVENTION

This invention relates to an improved external cylindrical gearing, e.g. for use in gearboxes, and, more particularly, in gear drives of prime movers and all kinds of processing machines.

DESCRIPTION OF THE PRIOR ART

An enclosed bearing facilitates manufacture of gear boxes and the like. As an example, consider the facilitated assembly and disassembly of a reduction gear box having a case receiving bearings, gear-wheels and shafts. The fabrication of the split case, however, is both labor-intensive and expensive. With enclosed bearings, used particularly in machine tools and automobile transmission gears, the case can be of a nonsplit type and inexpensive to manufacture but assembly and disassembly of the gear-wheels and bearings within the case can be a limitation.

A construction of a two-stage (two-speed) gear box meeting stringent limited-noise requirements is well known, this gearbox being built with a split case and having helical gears with parallel axes only, the reducing gearing thereof being made with two pairs of gears with reverse directions of the helix angles (i.e. LH runs with RH), see S.U. invention certificate 1,096,421.

The substantial drawback of this reduction gearbox is that, e.g., for a better flood oiling of all mating gears thereof, the gear ratio of gearing-up is accomplished by decreasing the gear ratio of gearing down, and as a consequence, the overall dimensions and the weight of the reducer are increased.

Also, known is a construction of a multipath external cylindrical gearing of the kind in which the power is divided between distinct paths. In a first step the power is partitioned and in a second step the power paths are combined, the gearing having an input pinion stem in engagement with the gear wheels of no less than two of the compound cluster spur gears thereof. The axes of the cluster spur gears are located round the periphery of a cylindrical surface and this surface lies along the axis of the input pinion-stem. The pinions of the cluster spur gears are engaged with a central gear wheel. The central gear wheel is journaled in such a way that it lies along the axis of the pinion stem. The rolling contact bearings are mounted in respective holes (bearing housings) of the case and cover thereof. The bearings support the cluster spur gears, and a friction coupling used to transmit the torque. The coupling serves not only to prevent an overload but more particularly, to gain the relative angular orientation of the rings of the cluster spur gears, in order to make meshing possible. The assembly proper of the bearings and cluster spur gears may be executed from the exterior of the case, see EP 0,271,898.

The above-mentioned gearing design if not free from the limitations for example the disclosed construction is tied up with a specific use and, as consequence, is not suitable for the general case of machine drives. It is impossible to add more stages in order to reach a still higher gear ratio. The gearing design if complicated which is due to the parts used and the respective locations thereof. The pinion stem and axle thereof are not easy to manufacture.

SUMMARY OF THE INVENTION

The external cylindrical gearing of the invention features a nonsplit case (one-piece case), an input pinion stem, an intermediate pinion stem fitted with respective gear wheels, and an output shaft fitted with a final gear wheel thereon. In accordance with the invention, the intermediate pinion stem has two journal necks and is journaled in radial roller bearings. The bearings are supported by the nonsplit case and in two collars on the respective outer races thereof, whereby in nonloaded zones of the bearing housings in the case radial installation slots are provided, each of the slots having a width greater than the maximum diameter of the inner race of the radial roller bearing. It is possible to use radial roller bearings of the kind in which respective inner races are not provided at all. The width of the intermediate slots thereof might be greater than the respective dimension of the journal necks.

With the external cylindrical bearings, qualified under low noise level requirements, the high speed step is divided between two distinct paths by means of two symmetrically arranged pairs of helical gears, the gears having opposite inclinations of the respective teeth on gears thereof (e.g. LEFT hand helix runs with RIGHT hand helix). With the bearings of the invention, the intermediate pinion stems (i.e. pinion shafts) having the journal necks journaled in the ball bearings immediately in the nonsplit case, just as in the above-mentioned bearings. The invention also includes a multi-path cylindrical external gearing. The gearing comprising a case (one-piece), fitted with a cover on one of the sides thereof, an input pinion stem in engagement with respective gear wheels of more than two composite double spur gears (or cluster spur gears), the axes of the cluster spur gears being located around the periphery of a cylindrical surface thereof, this surface being on the same line (axis) with the input shaft, the rings of the cluster spur gears being in engagement with a gearing-down central gear wheel which is on an output shaft aligned with the input shaft.

In accordance with the invention, either of the cluster spur gears comprises a pinion stem and a respective gear wheel thereof fitted on it, whereby the torque is transmitted, between the pinion stem and gear wheel by means of either a splined shaft splined hole connection or an interference fit. Each of the journal necks of the intermediate shafts lies in the nonsplit case, and more particularly, in the exterior wall thereof in radial roller bearings with the two collars on outer races. The shafts are journaled in the interior wall thereof in radial bearings. In the respective nonbearing zones of the bearing, holes are provided to respective roller bearings, radial installation slots being manufactured in the external wall of the case, the width of the slots being greater than the O/D of the ring of the intermediate pinion stem, whereby the slots representing a fractional cylindrical surface being manufactured in the external wall of the case, and the diameter of the surface being greater than the gear O/D and the surface being aligned with the central gear-wheel.

Two of the above-disclosed two-stage, multipath bearings, may be set out in series in a single, common nonsplit case. The bearings are separated by means of a partition wall, whereby a cylindrical hole divided by set installation has been manufactured in the wall and the diameter of the hold being greater than the O/D of the gear-wheels from the first (input) gearing. A "floating"

cluster gear links together the two bearings and comprises the input pinion stem from the second and a respective gearing-down thereof from the second gearing.

A considerable advantage of the invention is that it creates a possibility to mount in the nonsplit case members which are preassembled external to the case, these members comprising intermediate pinion stems, (or shafts with supporting journals), gear wheels, radial ball bearings, and the respective inner races thereof, thanks to the execution of the installation slots in the respective bearing housings thereof. Moreover, preassembly outside the nonsplit gear housing is facilitated by applying an interference fit between the shafts and gear-wheels thereof.

Thanks to the installation slots and cylindrical holes in the housing walls, it is possible to integrate, mount and connect in series two or more multipath, two-stage bearings in a single nonsplit housing which will result in higher gear ratios than hitherto while using suitable roller bearings.

In such a multipath gearing, the engagement of pinions with the respective gear-wheels thereof calls for the use of relative angular positions of the rings of all intermediate cluster gears, these positions being realizable and made secured by assembling the gear wheel with the pinion stem with an interference fit (e.g. a press fit). Thanks to the invention created opportunities, this fit can be used in all bearings being mounted in a nonsplit type cases.

BRIEF DESCRIPTION OF THE DRAWING

The above and other objects, features, and advantages will become more readily apparent from the following description, reference being made to the accompanying drawing in which:

FIG. 7 is an axial section through a multipath geared motor with four reduction stages.

SPECIFIC DESCRIPTION

Figure 1:
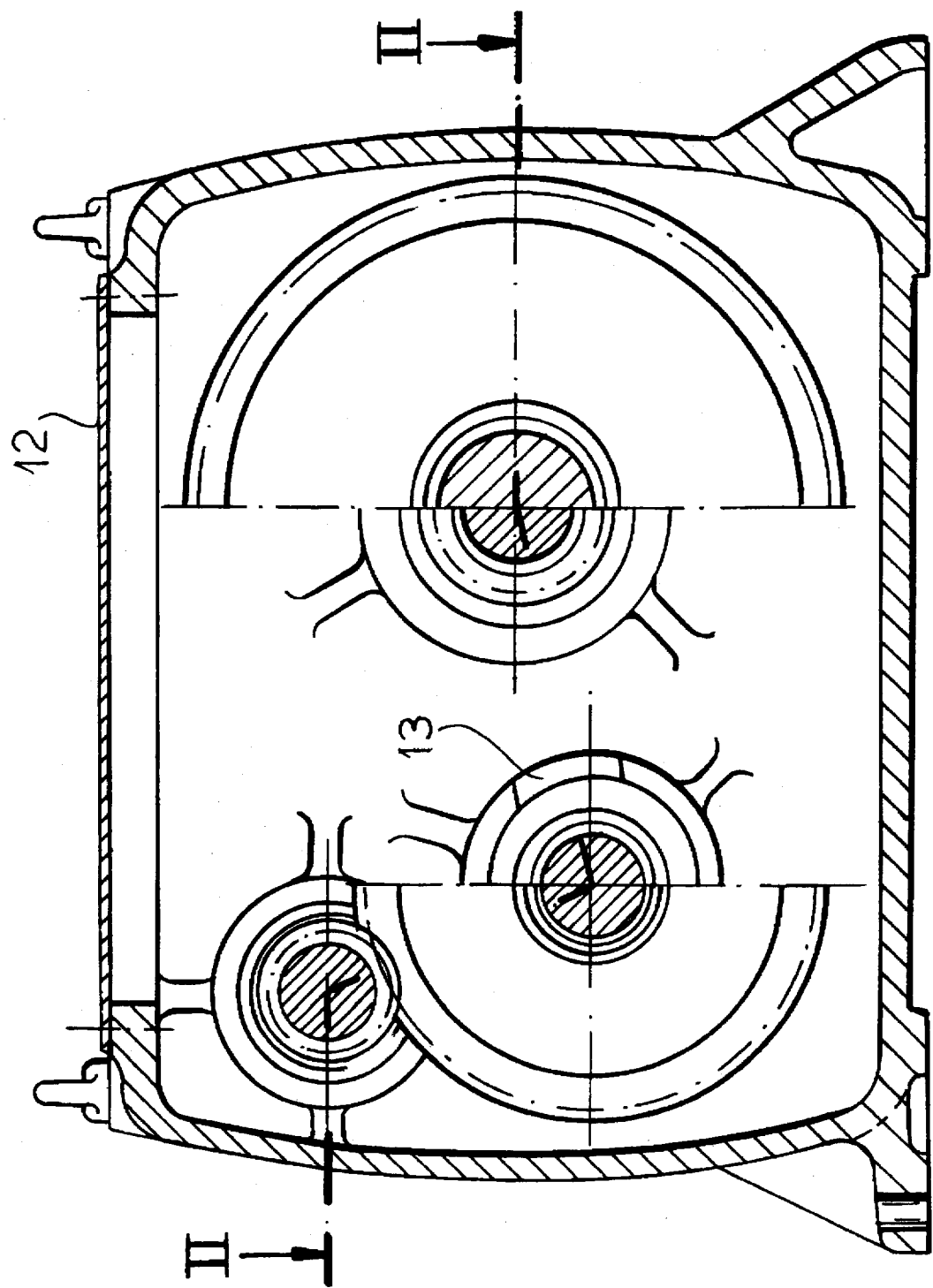
FIG. 1 is a spur gear gearbox for a two-stage reduction gearing seen in cross section along the line I—I of FIG. 2.
Figure 2:
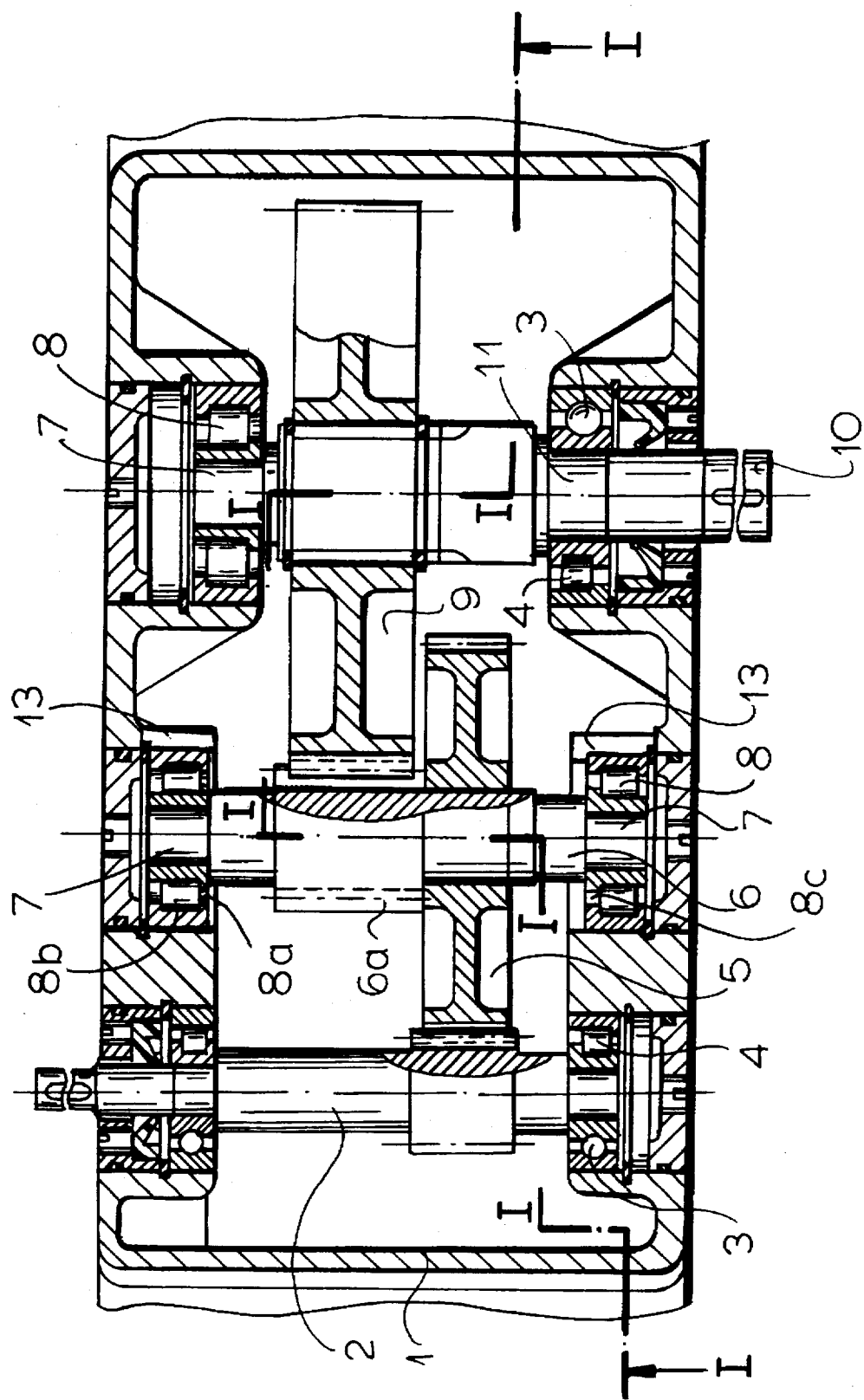
FIG. 2 is a cross sectional view taken along the line II—II of FIG. 1.

A two-stage cylindrical gearbox is illustrated in FIGS. 1 and 2 and comprises a nonsplit case (one-piece part) 1, and an input spur pinion stem 2, the pinion stem being supported by ball bearings 3 or by roller bearings 4 and being in engagement with a gear wheel 5. The gear wheel 5 is mounted on an intermediate spur pinion stem 6, its pinion stem having two journals 7 and being journaled in radial roller bearings 8 which have two shoulders 8a, 8b in the respective outer races thereof. The roller bearings 8, shown in FIG. 2, each has a single shoulder 8c for the respective inner race, the inner races being assembled with the journals 7, but the roller bearings 8 need not be provided with the inner races, whereby the respective bearing rollers thereof being revolved immediately around the journals 7 of the shaft 6. The gear teeth 6a of the intermediate pinion stem 6 mesh with a spur gear 9 which is assembled with an output shaft 10, a ball bearing 3 or the rollers bearing 4 giving support to the neck 11 of the shaft 10. The roller bearing 8 has the two shoulders on the outer race thereof and has an inner race with the single shoulder, the bearing giving support to the end journal of the shaft 10. The diameter of the bearing housing in the gear 9 being greater than the respective inner race shoulder diameter of the bearing 8. A nonloaded lid 12 is applied to the nonsplit case 1 and, in the non-loaded zones of the bearing housings for receiving the intermediate shaft 6 bearings O/D, in the case 1, radial slots 13 are machined, the width of the slots being no less than the diameter of the inner race shoulder of the roller bearings 8 or of the journals respectively, if the inner race is not provided.

Figure 3:
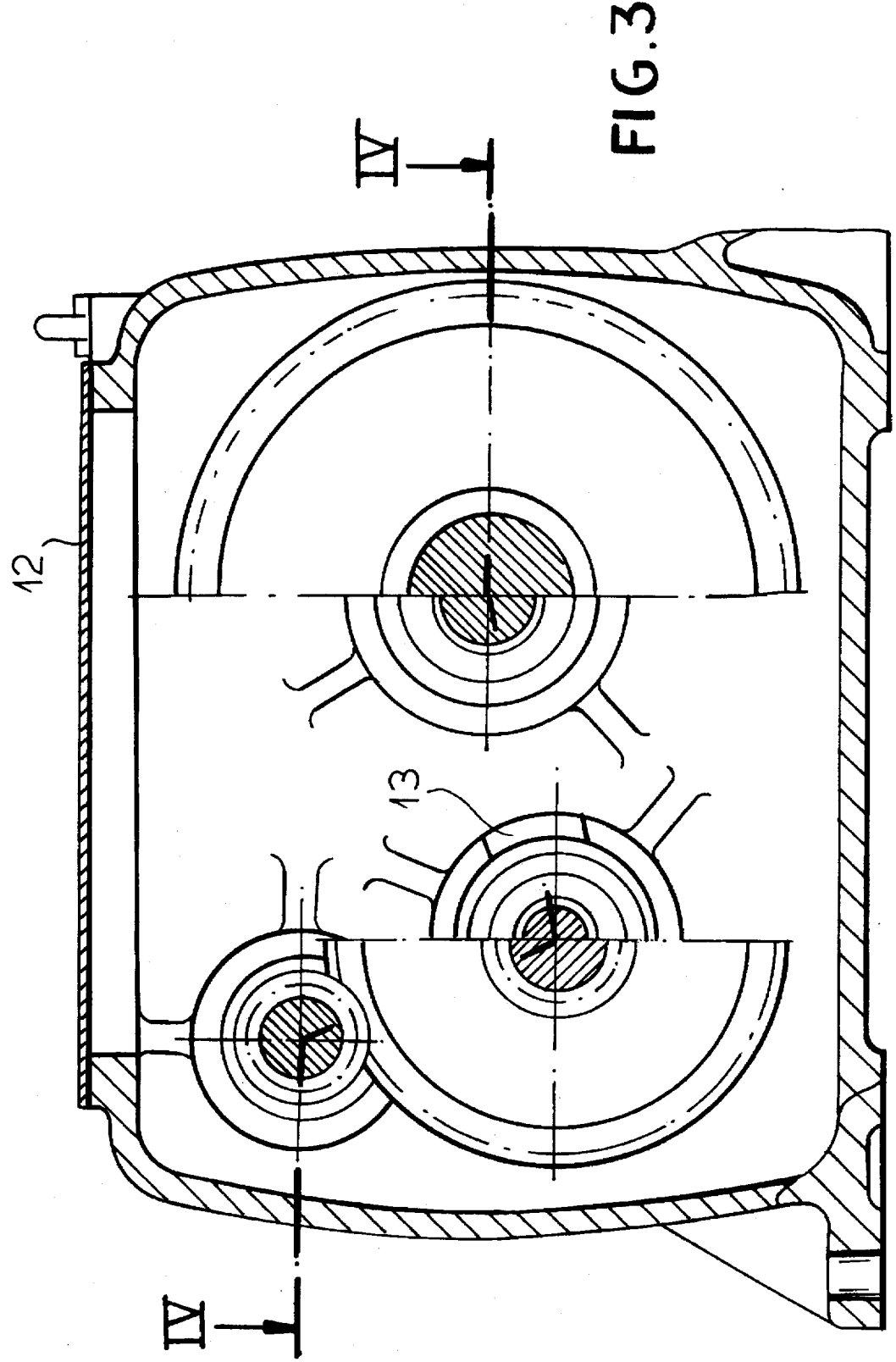
FIG. 3 is a view similar to FIG. 1 of a helical-gear gearbox with two reduction stages and designed for minimum noise levels, the view being in section along the line III—III of FIG. 4.
Figure 4:
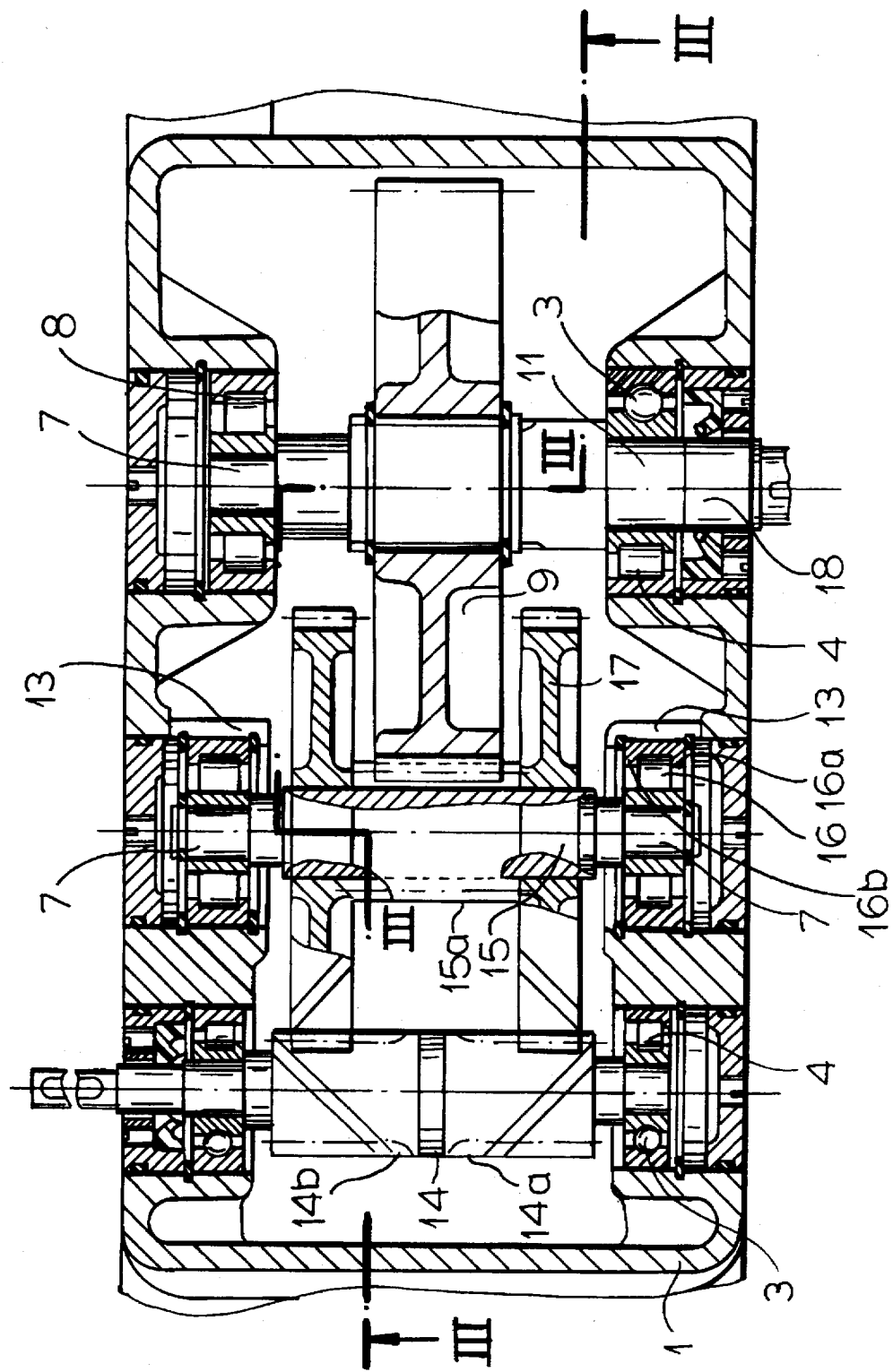
FIG. 4 is a longitudinal section taken along the line IV—IV of FIG. 3.

The two-stage spur reduction gearbox meeting the most stringent noise requirements is depicted in FIGS. 3 and 4. The gearbox comprises nonsplit case 1 and an input pinion stem 14, together with two helical tooth rims 14a, 14b, the rims featuring opposite directions of hand. An intermediate spur pinion stem 15 with two end journals 7 journaled in radial roller bearings 16 featuring outer races with two shoulders 16a, 16b and inner races without the shoulders. On this pinion stem are mounted two helical gears with the opposite direction of hand, the helical gears being in mesh with the respective tooth rims 14a, 14b of the input pinion stem 14 thereof. An output shaft 18 carries a spur gear 9 in mesh with the toothed rim 15a of the pinion stem 15 thereof. Both the input and the output shafts are journaled in a similar manner, as has been described for the first spur reduction gearbox and depicted in FIGS. 1 and 2 respectively, and in the non-loaded zones of the bearing housings for the bearings 16, in the case 1 are machined radial slots 13, the width of the slots being no less than the outside diameter (O/D) of the inner races of the bearings 16 or the diameter of the journals 7, if the roller bearings to be used are of the type without the inner races.

The general design feature of the two disclosed spur reduction gearboxes might be seen on FIGS. 1 and 3 and, more particularly, the axes of rotation for the shafts 2, 6 and 10 (in FIG. 1), and 14, 15 and 18 (in FIG. 3), respectively are non-coplanar motor.

Figure 5:
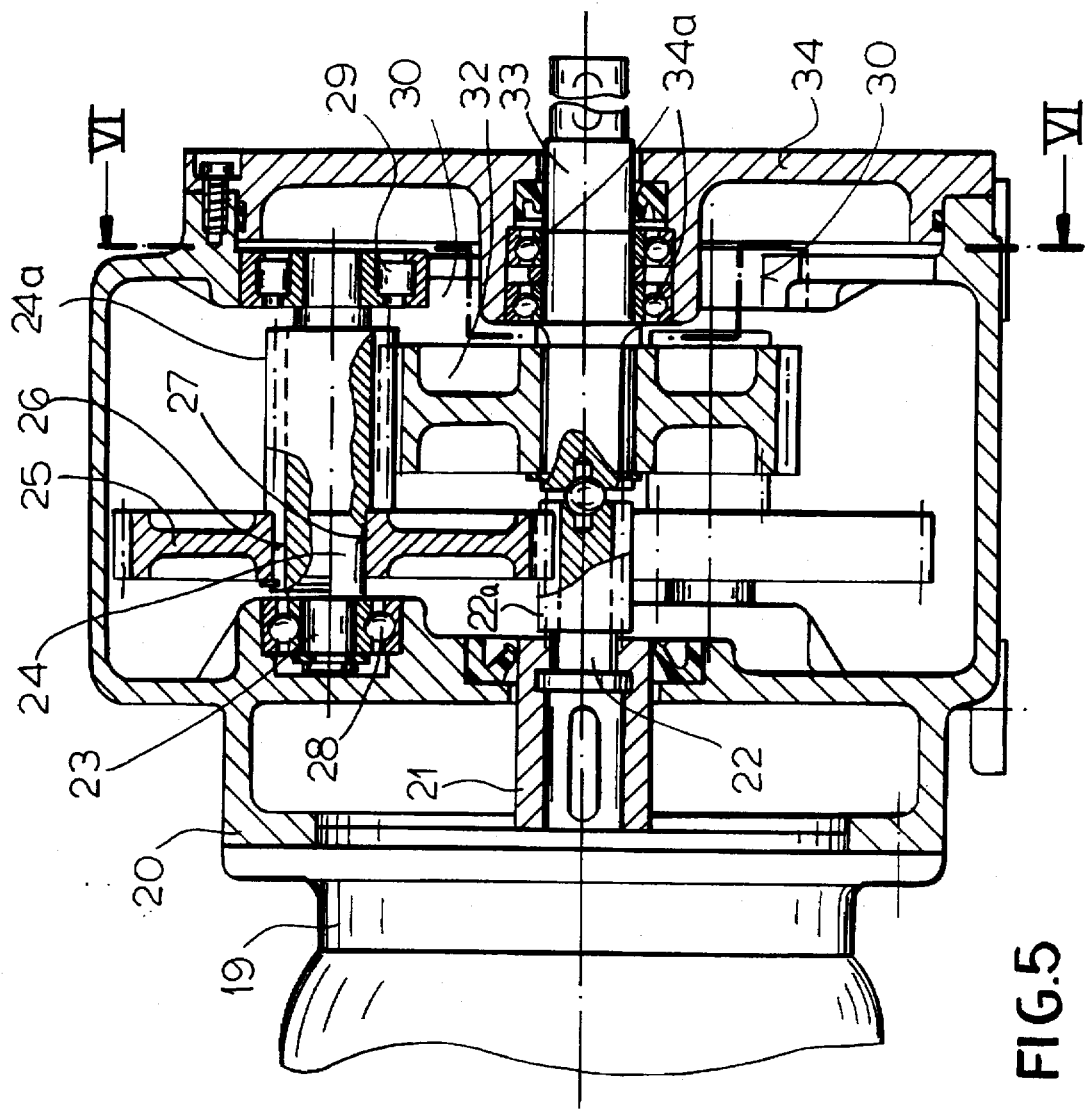
FIG. 5 is an axial section through a multipath geared motor with two reduction stages.
Figure 6:
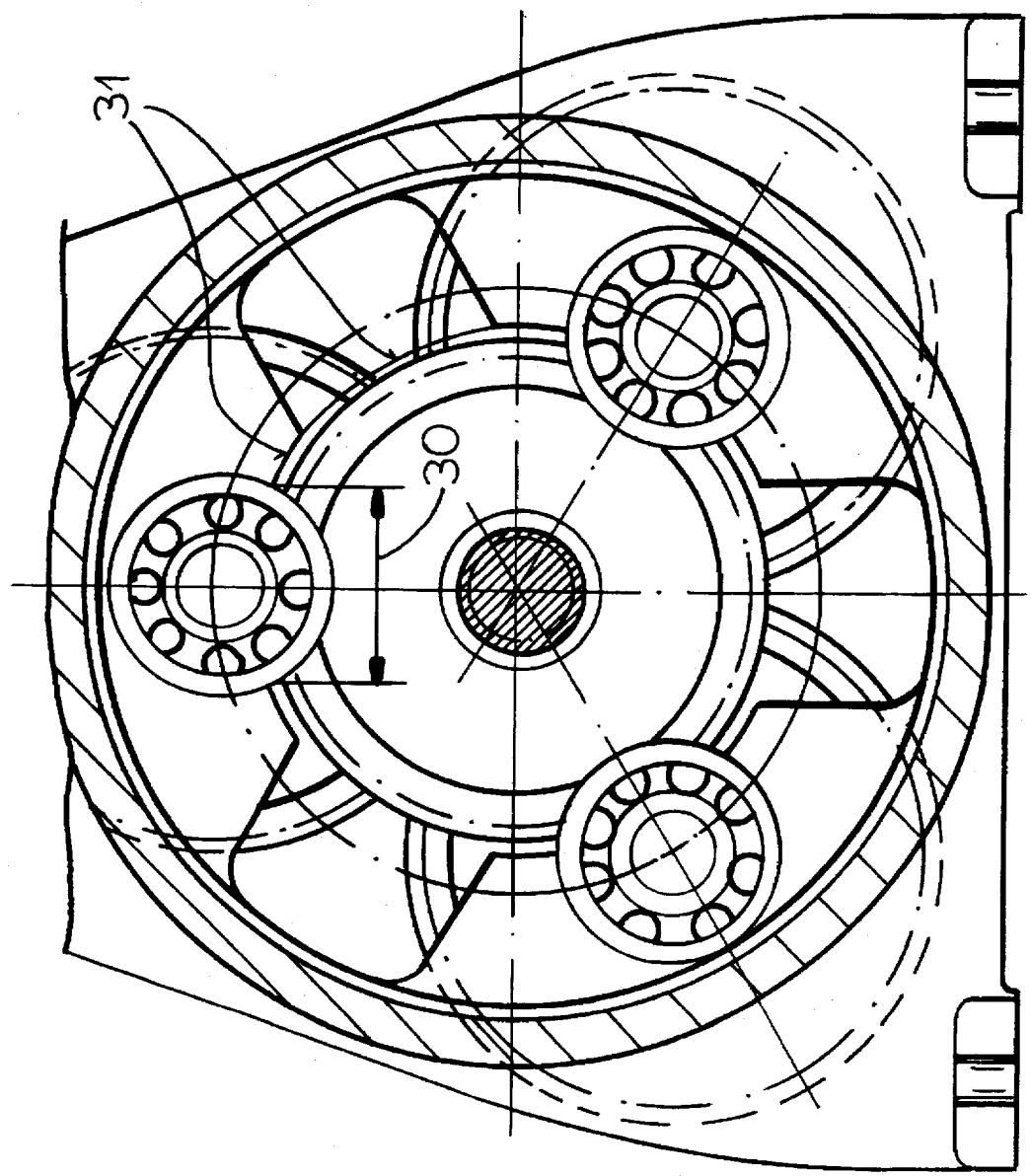
FIG. 6 is a section along the line VI—VI of FIG. 5.

A multipath, two-stepped geared motor, illustrated in FIGS. 5 and 6, comprises a motor 19 flanged to a non-split case 20, whereby on the shaft of the motor there is mounted a clutch 21. The clutch is connected to an input pinion stem 22 by means of an involute shaft/splined hole coupling, whereby the respective tooth rim 22a of pinion stem 22 meshes with the three cluster gears 23. The axles of the cluster gears 23 lie along a cylindrical surface coaxial with the input pinion stem 22. Each of the cluster gears 23 is affixed to an intermediate pinion stem 24 and a gear reducer 25, the pinion stem 24 and gear reducer 25 being connected by means of an involute shaft/splined hole coupling or a press fit 27. The intermediate pinion stems 24 are journaled in radial bearings 28 and supported by the wall of the box 20. This wall is located at the input side. The pinion stems 24 are also journaled in radial roller bearings 29 at the output side thereof. The radial roller bearings each have two shoulders on outer races in the nonloaded zone of the respective bearing housings for the roller bearings 29. In the box wall 20 at the output side thereof, radial installation slots 30 are cut, the width of the slots being no less than the diameter of the addendum circle of the rims of the intermediate pinion stems 24, the slots being interruptions in a cylindrical surface 31 coaxial with the center axle of the gearbox. The diameter of the slots might be no less than the diameters of the addendum circles (i.e. O/D) of the gear reducers 25 and 32. The rims 24a of the intermediate pinion stem 24 being meshed with a central gear 32 aligned with input pinion stem 22 and being linked to the output shaft 33. All rims of the gear wheels are of the spur type, and the output shaft 33 is journaled in radial bearings 34a in the lid 34.

Figure 8B:
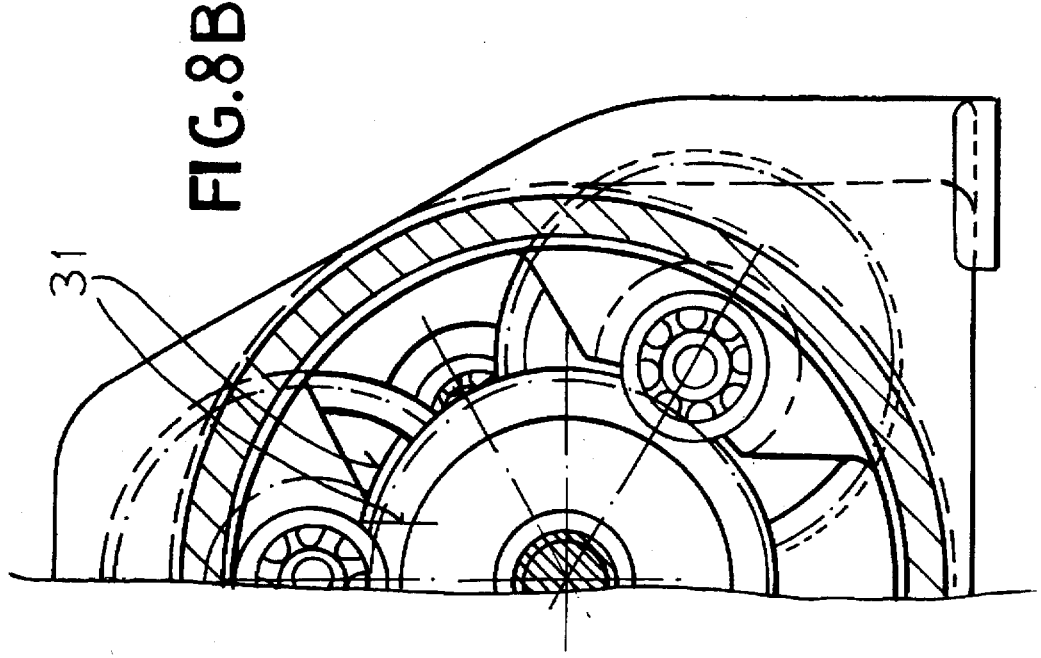
FIGS. 8a and 8b are respectively partial sectional views taken a long the lines VIIIa—VIIIa and VIIIb—VIIIb of FIG. 7 respectively.
Figure 8A:
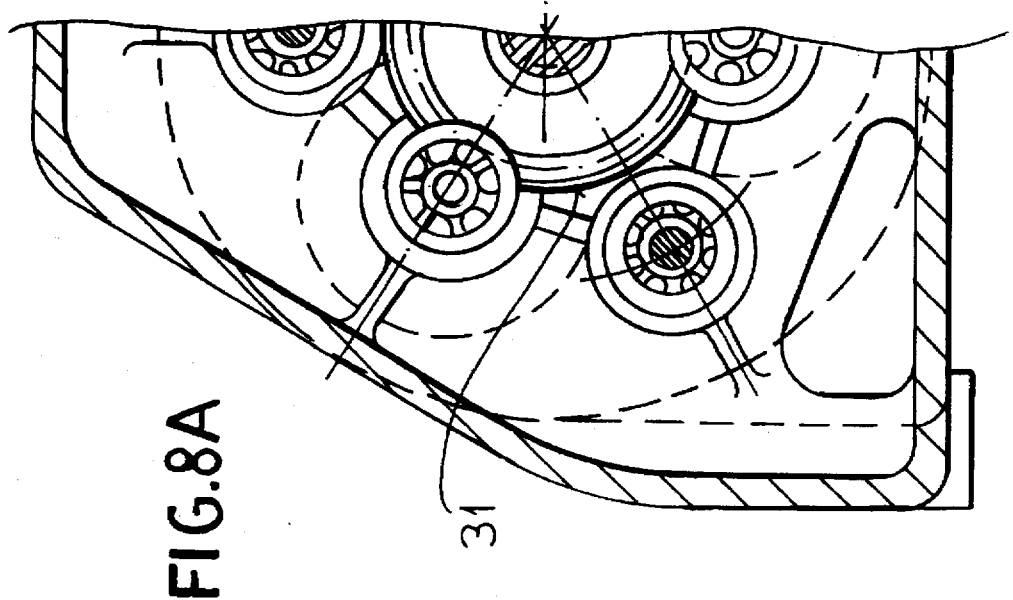

A multipath, four-stage gear motor is illustrated in FIGS. 7 and 8 and comprises two series-connected two-stage multipath bearings housed in a common nonsplit case 35. An intermediate wall 36 is provide with bearing housings for the first and the second gearings respectively. Intermediate pinion stems 24 are supported (journaled) in the housings, the bearing housings 36b and 36c of walls 36a and 36. A central gear 32 from the first gearing is connected by means of a shaft/splined hole coupling to the driver pinion stem 37 of the second gearing. The pinion stem 37 meshes with cluster bars 25 and can "float" in radial direction but is bounded in axial direction by means of two fulcrum balls 39, the balls being placed in the respective center holes of the shafts thereof.

The assemblage of the reduction gear boxes, depicted in FIGS. 1, 2, 3 and 4, is initiated by a selective assembly of the shafts 2 (14) with the bearings ¾, the shafts 6 (15) with the gear wheels 5 (17), and the respective inner races of the roller bearings 8 (16) thereof, the assembly being carried out external to the case (1). Thereafter the assembled units and the shafts 6 (15) are inserted into the case 1 through the open hole from above, and set up in the case 1 using the mounting (i.e. an easy-to-get-at) slots 13 through which pass also the inner races of the roller bearings 8 (16), following which the set proper of the external races of the bearings 8 (16) plus the roller cages is performed.

The assemblage of the multipath reduction gearboxes, depicted in FIGS. 5, 6, 7, and 8, is initiated by a selective assembly of the shafts 24 with the gears 25, the bearings 29, the shafts 33 with the gears 32 and the respective radial bearings thereof, and the shaft 37 to the gear 32, in order to make a cluster gear 38, whereby the assembly being carried out external to the cases 20 (35), hereinafter the assembled units with shafts 24 are coupled in the cases 20 (35) through the respective holes 31 thereof, which is followed by a radial displacement, in order to permit the suitable passing of the rims of pinion stems (pinion-shafts) 24 through the mounting slots 30, followed by an axial moving of the units register with the axis of the respective bearing cases thereof, the cases being executed to suit bearings 28 and 29. Thereafter, through the holes 31 in the cases 20 (35), the cluster gear 38 and units with shafts 33 are set up, which is followed by respective placement of the outer races of roller bearings 29 plus the roller cages thereof, and at last, the lid 34 is placed thereon.

We claim:

1. A gearbox comprising:

a nonsplit casing having a pair of opposing walls;

an input pinion stem journaled in said casing and capable of being driven;

at least one intermediate pinion stem journaled between said opposing walls;

an output shaft journaled in said casing, said pinion stems each being formed with toothed rims;

gears in said casing meshing with said toothed rims and operatively coupling said input shaft with a said intermediate pinion stems and said output shaft with a said intermediate pinion stem to effect a speed change between said input pinion stem and said output shaft;

a pair of inwardly projecting generally cylindrical opposite bearing housings on said walls for each of said intermediate pinion stems, said intermediate pinion stems having journals at opposite ends thereof, said bearing housings having radially open slots of a width greater than diameters of said journals to enable lateral insertion of said journals into said housings; and respective radial roller bearings retaining each of said journals in a respective one of said housings, each of said radial roller bearings including an outer bearing race having a pair of inwardly projecting shoulders flanking an array of rollers thereof.

2. The gearbox defined in claim 1 wherein said radial roller bearings include respective inner races mounted on said journals, said slots being of a width at least equal to outer diameters of said inner races.

3. The gearbox defined in claim 1 wherein said gears include at least one pair of gears on a respective intermediate pinion stem having helical gearing of opposite hand.

4. A gearbox comprising:

a nonsplit casing having a pair of opposite walls spaced apart along an axis of said casing, said casing being axially open at one of said walls;

an input pinion stem extending into said casing along said axis through an opening in the other of said walls, formed with a toothed rim, and capable of being driven;

a plurality of intermediate pinion stems journaled between said opposing walls, having respective axes lying along a cylindrical surface centered on said axis, and each having respective end journals;

respective cluster spur gears on said intermediate pinion stems meshing with said toothed rim of said input pinion stem, said intermediate pinion stems having respective toothed rims;

an output shaft extending along said axis into said casing through said one of said walls and having an output gear meshing with the toothed rims of said intermediate pinion stems, said spur gears and said output gear having the same addendum circles;

a pair of generally cylindrical opposite bearing housings on said walls for each of said intermediate pinion stems, said bearing housings on said one of said walls having radially open slots of a width greater than diameters of said journals to enable lateral insertion of said journals into said housings, said slots being formed as openings in a cylindrical surface of a diameter greater than addendum circles of said gears;

respective radial roller bearings retaining each of said journals in a respective one of said housings, each of said radial roller bearings including an outer bearing race having a pair of inwardly projecting shoulders flanking an array of rollers thereof; and a detachable cover closing said casing at said one wall.

5. The gearbox defined in claim 4 wherein said input shaft is an output shaft for a first gearing stage in said casing.

* * * * *